United States Patent
Kivlen

[11] 3,889,877
[45] June 17, 1975

[54] FURNACE OVER-PRESSURE PREVENTION

[75] Inventor: John A. Kivlen, Denville, N.J.

[73] Assignee: Exxon Research and Engineering Company, Linden, N.J.

[22] Filed: July 16, 1973

[21] Appl. No.: 379,452

[52] U.S. Cl. ............................................. 236/15 C
[51] Int. Cl. ............................................. F23n 5/24
[58] Field of Search ............. 236/15 C, 94; 122/356

[56] References Cited
UNITED STATES PATENTS

| | | | |
|---|---|---|---|
| 1,931,906 | 10/1933 | Smith | 236/15 C |
| 1,987,642 | 1/1935 | Schueler | 236/15 C |
| 2,788,175 | 4/1957 | Bourek et al. | 236/94 X |
| 3,237,634 | 3/1966 | Colby, Jr. | 236/94 X |
| 3,416,470 | 12/1968 | Hey et al. | 236/15 C |

Primary Examiner—Edward G. Favors
Attorney, Agent, or Firm—H. N. Wells; F. Donald Paris

[57] ABSTRACT

An apparatus for preventing the over-pressuring of a furnace which comprises a small diameter heat resistant tube inserted through the side of the furnace just below the convection section. A thermocouple is used to detect whether cool air is passing through the tube into the furnace because it is operating with a negative pressure or whether the pressure is positive and hot combustion gases are flowing out of the furnace. The change in temperature is detected and used to warn operating personnel of potential damage to the furnace. The temperature change may also be used to take some predetermined corrective action automatically.

3 Claims, 1 Drawing Figure

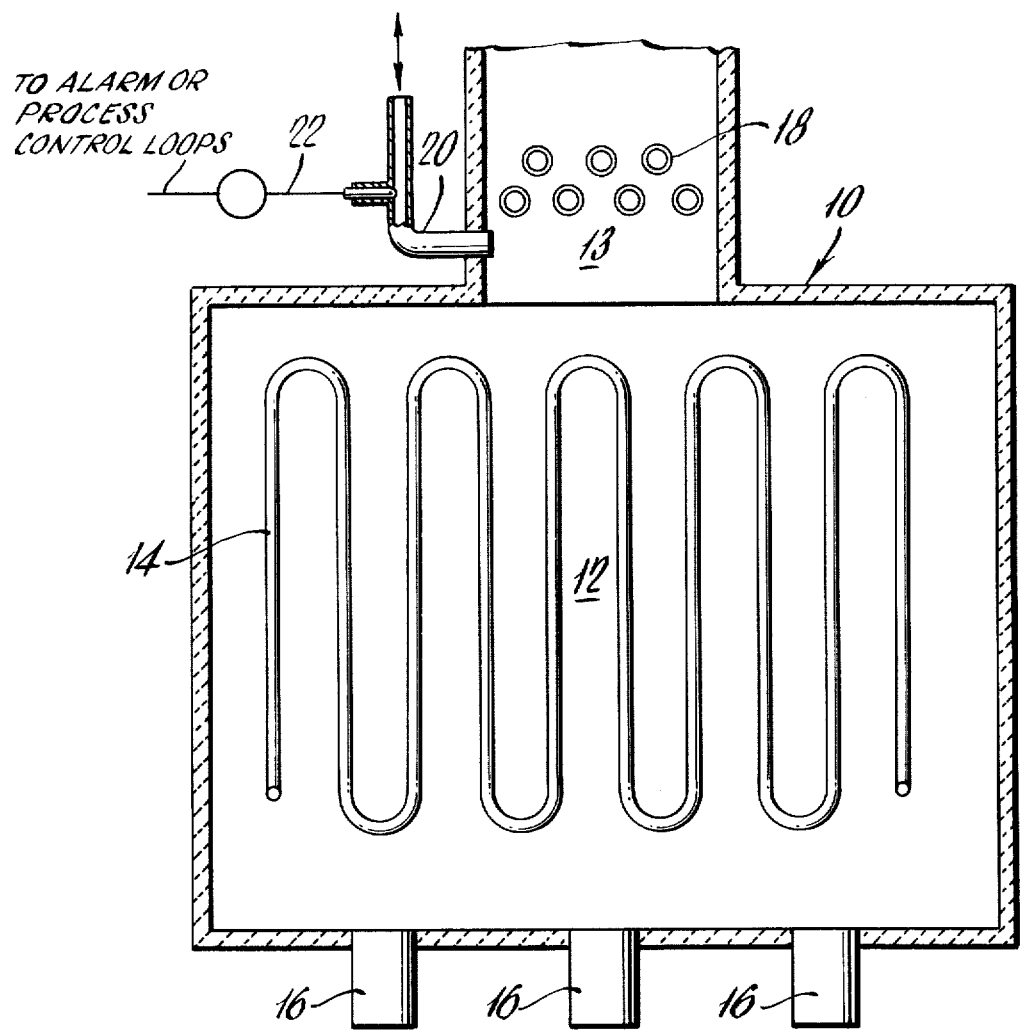

FURNACE OVER-PRESSURE PREVENTION

BACKGROUND OF THE INVENTION

Industrial furnaces, such as are used in the petroleum and chemical industries, usually operate with either natural or induced draft. In either instance, the furnaces are designed to operate under a negative pressure, that is to say, the static pressure inside the furnace is below that of the ambient barometric pressure, owing to the high temperature and consequent low density of the gases within the furnace. A typical value, for example, of a furnace operating with natural draft would be 0.01 to 0.1 inch of water negative pressure within the fire-box.

In order to operate these furnaces at their most efficient condition, or to operate them at their maximum possible capacity, it is essential to maintain the highest pressure possible within the furnace, i.e., as close as possible to the barometric pressure, but always below it. Another way to express this principle is that the negative pressure is made as small a value as possible, since it approaches the pressure of the atmosphere surrounding the furnace. Typically a pressure difference of minus 0.02 inch of water between the radiant section and barometric pressure external to the furnace might be used as a minimum. Should this difference become positive, extremely hot flue gas will exhaust through the furnace structures and severely damage it. In addition, conditions potentially hazardous to operating personnel are established — positive pressures may result in flames finding their way out of the furnace firebox.

For normal analysis and control of furnace operations, it is typical of the prior art to measure pressure differences relative to barometric pressure at various locations within the furnace and then to adjust the furnace draft to bring the pressures to the optimum conditions. When, however, the furnace operation approaches the minimum negative pressure, the performance of differential pressure instruments becomes unreliable. They may be severely influenced by surrounding conditions. For example, attempting on a very windy day to measure differential pressure at such very low levels is practically impossible. Then, control of the furnace to the optimum pressure becomes very difficult, if not impossible. Operators then have two choices. One, to operate less efficiently on the "safe side" or, alternatively, to risk possible damage to the equipment and hazard to themselves if the furnace is over-pressured. A means of detecting potentially hazardous conditions would minimize uncertainty as to furnace pressure and permit operation under the preferred conditions without serious risk. A novel device which will provide the needed information has been developed and is the subject matter of the present invention.

SUMMARY OF THE INVENTION

Over-pressuring of industrial furnaces can be prevented if a change from negative to positive pressure is detected at once. A small passageway is provided between the atmosphere and the inside of the furnace just below the convection section — a length of small diameter stainless steel tubing is suitable. When the furnace is operating normally and under a negative pressure relative to barometric pressure, air flow is inward, that is, cool air from the atmosphere passes into the furnace, but in such small quantities that the furnace operation is not disturbed. In the upset condition when the furnace has a positive pressure, the normal inward flow of air will be reversed. Very hot combustion products from the inside of the furnace will begin to flow outwardly through the passageway to the atmosphere. This flow reversal may be detected by several possible means. in a preferred embodiment, a single thermocouple is attached to or inserted within a stainless steel tube passageway and which can quickly detect the sharp change of temperature which occurs when flow reverses. The temperature increase may be transmitted to an alarm at the control board, notifying the operators that corrective action must be taken. Alternatively, in a more complex system, the signal may be used to adjust control loops supervising a number of important process variables, thereby taking corrective actions which the operators would otherwise have to make manually. For example, reducing furnace feed rate, reducing firing rate, and adjusting the furnace dampers may be suitable to reestablish negative pressure. All of these corrective actions will reduce furnace temperature and pressure, thus protecting it from damage. Prompt and positive warning of a hazardous over-pressure condition thus permits operating near optimum conditions at all times.

BRIEF DESCRIPTION OF THE DRAWING

The sole FIGURE illustrates schematically the installation and operation of a device according to the invention.

DESCRIPTION OF THE PREFERRED EMBODIMENT

The sole FIGURE illustrates schematically a portion of a typical furnace 10 used in the petroleum and chemical industries. In this furnace, tubes 14 receive direct radiant heat from the flames produced by burners 16 and from the refractory lining of the radiant section 12. Tubes 18 represent the lower rows of the convection section where heat is transferred primarily by convective heat transfer rather than by radiation. Pressure in the upper portion of the radiant section 12 immediately below the convection section, the area known as the arch section 13, will normally operate at a pressure below the outside barometric pressure. There may be as little as 0.02 inch of water differential between the furnace and the surroundings when optimum processing conditions are established, either to achieve minimal fuel consumption or alternatively maximum production.

Under these conditions, the usual differential pressure instrument is of limited value and insufficiently accurate to be relied upon. In accordance with the invention, a small passageway is provided between the atmosphere and the arch portion of the furnace. In particular, a small diameter stainless steel tube 20 has been found to be useful, but other modes of admitting air in the limited quantities might also be used.

Considerations which must be kept in mind in providing such an air inlet are: first, that the air passageway must be small enough to prevent disturbing the performance of the furnace and reducing furnace efficiency; second, the air passageway must be large enough in order to assure a continuous air flow at all times, that is, blockage of the passageway could either lead to a false signal or no signal at all in a true emergency; third, since exceedingly hot gases of the order of 1200°–1500°F. will pass through the passageway 20 where a positive pressure is established in arch section 13, there could be damage to the sensing device, if not properly accommodated in its design.

Ambient air normally flows inwardly through tube 20. Thus, the tube would ordinarily operate at near ambient temperatures. Should the furnace begin operating under positive pressure, the air flow will be instantly reversed and hot gases will begin to flow outwardly through the tube. This reversal could quickly raise the temperature as much as 1200°–1500°F. Reversal of air flow could be measured by means of a flow meter or other simple direction indicating device. However, in the preferred embodiment a single thermocouple 22 is attached to the exterior of the tube 20 or inserted into a hole provided for it. The thermocouple will sense the temperature change very quickly since the time needed for the tube to heat up is extremely small. Any temperature above about 250°F. would activate an alarm on the operator's control board in order that immediate action could be taken.

In a more technically sophisticated system, upon sounding of the alarm, automatic adjustments could be made. For example, acting through conventional control loops already required for furnace operations, there could be a reduction of feed rate (which would indirectly reduce fuel firing through other instrumentation). Other possible corrective actions which could be made by using existing control loops include direct reduction of firing rate by adjustment of a flow controller acting on the fuel flow, or a motor operated damper could be opened slightly in order to correct the over-pressure condition. Any number of modes of correction might be used, depending upon the instrumentation which is applied for process control in the specific furnace to which the invention is applied.

In an alternative version (not shown), two thermocouples might be used—one measuring the temperature of the ambient air at all times and the other measuring the temperature of the tube 20. The differential temperature between these two thermocouples would be used to determine when a flow reversal occurs. In other versions, multiple thermocouples could be used in order to back up the fundamental alarm device.

The foregoing description of the preferred embodiment is for illustrative purposes only and should not be construed to limit the scope of the invention which is defined by the claims which follow.

What is claimed is:

1. A furnace having radiant and convection sections and at a location directly below said convection section normally operating at negative pressure relative to ambient barometric pressure, including an apparatus for preventing over-pressuring of said furnace when said negative pressure exceeds said ambient barometric pressure comprising:
   a. an open passageway located externally of said furnace connecting the interior of said furnace adjacent and below the convection section with the surrounding atmosphere, said passageway being constructed and arranged to permit continuous substantially unobstructed flow therethrough and of uniform size such that during normal operation ambient air normally flows inwardly to said furnace in sufficiently small quantities so that normal furnace operation is undisturbed and when said furnace is at positive pressure the normal inward flow of ambient air is reversed so that combustion gases flow outward through said passageway;
   b. flow reversal detecting means operably connected with said passageway for detecting the reversal of flow in said passageway, said detecting means comprising a temperature sensing means for detecting changes in temperature in said passageway including indicating a low temperature when said ambient air flows into said furnace and a high temperature when said combustion gases flow out of said furnace; and
   c. alarm means operably connected to said flow reversal detecting means and responsive to a detected change in flow direction in said passageway for providing an alarm signal when said detecting means indicates a high temperature resulting from combustion gases passing outward through said passageway.

2. The apparatus of claim 1 wherein said passageway means is a small diameter stainless steel tube.

3. The apparatus of claim 1 wherein said flow reversal detecting means comprises a single thermocouple.

* * * * *